United States Patent [19]

Thun, Jr.

[11] Patent Number: 4,728,113
[45] Date of Patent: Mar. 1, 1988

[54] PIPE CONNECTOR FOR A TUBULAR FRAME BICYCLE

[75] Inventor: Alfred Thun, Jr., Ennepetal-Rüggeberg, Fed. Rep. of Germany

[73] Assignee: Alfred Thun & Co. GmbH, Ennepetal, Fed. Rep. of Germany

[21] Appl. No.: 892,717

[22] Filed: Jul. 31, 1986

[30] Foreign Application Priority Data

Aug. 1, 1985 [DE] Fed. Rep. of Germany ....... 3527685

[51] Int. Cl.$^4$ ...................... B62K 19/28; B62K 19/22
[52] U.S. Cl. ............................ 280/281 R; 228/173.4; 403/246
[58] Field of Search ................. 29/157 T; 280/281 R; 228/173.4; 403/246, 245, 205, 403, 270

[56] References Cited

U.S. PATENT DOCUMENTS

| 595,148 | 12/1897 | Cobb | 280/281 R |
| 4,479,662 | 10/1984 | Defour et al. | 280/281 R |
| 4,585,246 | 4/1986 | Diekman et al. | 280/281 R |

FOREIGN PATENT DOCUMENTS

| 143229 | 11/1949 | Australia . |
| 770911 | 10/1980 | U.S.S.R. . |
| 1164135 | 6/1985 | U.S.S.R. . |

Primary Examiner—John J. Love
Assistant Examiner—Charles R. Watts
Attorney, Agent, or Firm—Karl F. Ross; Herbert Dubno

[57] ABSTRACT

A tubing connector for a tubular frame of a bicycle comprises a plurality of hemispherical mounting pieces protruding radially exteriorly from the tubing connector. These hemispherical mounting pieces are positioned on the tubing connector so that each of the ends of the tubes of the tubing frame can be engaged on one of the mounting pieces and attached thereto for example by welding. Using hemispherical instead of cylindrical mounting pieces allows the same tubing connector to be used in many different tubing frames having different tubing diameters and tubing angles.

2 Claims, 3 Drawing Figures

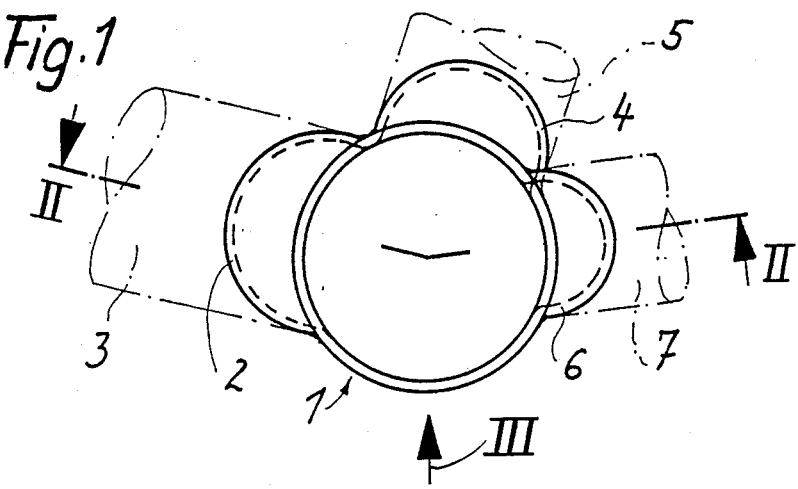
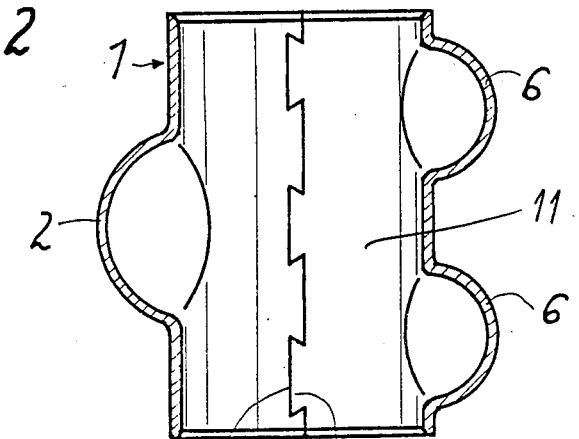
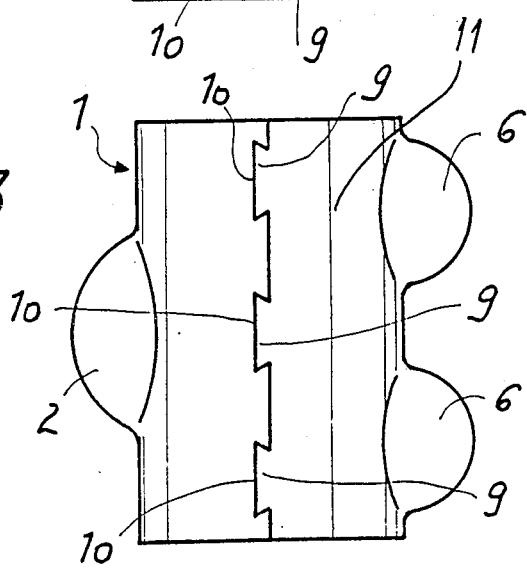

PIPE CONNECTOR FOR A TUBULAR FRAME BICYCLE

FIELD OF THE INVENTION

My present invention relates to a tubing connector for a tubular frame of a bicycle and, more particularly, to the bottom pedal-crank bearing housing of a bicycle frame.

BACKGROUND OF THE INVENTION

A tubing connector for a tubular bicycle frame (German Utility Model DE-GM No. 18 34 373) has a plurality of mounting pieces protruding radially outwardly which are secured to the ends of the tubes of the tubing frame. These mounting pieces can be formed by pressing out portions of a wall of the tubing connector.

As taught in German Utility model No. 18 34 373 each of these mounting pieces is cylindrical, that is similar in shape to the tubes.

However because of this shape a different tubing connector is required for tubing frames having tubes of a different diameter and/or with different frame angles. As a result manufacturing and parts-storage costs are comparatively high.

OBJECTS OF THE INVENTION

It is an object of my invention to provide an improved tubing connector for a tubular frame of a bicycle.

It is also an object of my invention to provide an improved tubing connector for a tubing frame of a bicycle which can be used in a variety of tubing frames having different frame geometries and/or different tubing diameters.

SUMMARY OF THE INVENTION

These objects and others which will become more apparent hereinafter are attained in a tubing connector for a tubular frame of a bicycle comprising a plurality of mounting pieces protruding radially exteriorly therefrom for the ends of the tubes of the tubing frame connected to or to be connected to the mounting pieces. Each mounting piece is a pressed out portion of the tubing connector.

According to my invention each of these mounting pieces is hemispherically shaped.

A single tubing connector with hemispherically shaped mounting pieces according to my invention may be used to simplify the manufacture of a variety of different bicycle frames having tubes with a variety of tubing diameters in different angular positions.

Advantageously the tubing connector is a bottom bearing housing for the pedal crank bearings and the mounting pieces are pressed out from a wall of the tubing connector. Furthermore the bottom bracket bearing housing has one mounting piece for a saddle tube of the tubing frame, another mounting piece for a lower frame tube and two other mounting pieces for a bifurcated rear member of the tubing frame.

BRIEF DESCRIPTION OF THE DRAWING

The above and other objects, features and advantages of my invention will become more readily apparent from the following description, reference being made to the accompanying drawing in which:

FIG. 1 is a side elevational view of a tubing connector according to my invention which is also a bottom bracket bearing housing;

FIG. 2 is a cross sectional view of the tubing connector of FIG. 1 taken along the section line II—II of FIG. 1; and, FIG. 3 is a bottom plan view of the tubing connector as seen in the direction III of FIG. 1.

SPECIFIC DESCRIPTION

The bottom bracket bearing housing 1 for the pedal-crank shaft bearing of a bicycle comprises a first mounting piece 2 for a lower frame tubing 3, a second mounting piece 4 for a saddle tubing 5 and two-third mounting pieces 6 for a rear forked tubing 7 which are hemispherically shaped pressed out portions of the tubing connector wall 11.

These hemispherically shaped mounting pieces 2, 4 and 6 are made by deep drawing. The first, second and third mounting pieces 2, 4 and 6 protrude radially toward the exterior from the bottom bracket bearing housing 1.

The bottom bracket bearing housing 1 (or tubing connector) is formed from two sheet metal blanks or plate structures whose longitudinal edges when put together with each other are attached to each other by a tongue-and-groove-type joint including the projections 9 and the recesses 10 in which they fit.

The ends of the tubes 3, 5 and 7 facing the bottom bracket bearing housing 1 are trimmed at right angles to their longitudinal directions and axes and are attached to the hemispherically shaped mounting pieces 2, 4 and 6 by a circular weld seam.

The tubing frame of the not completely shown bicycle comprises the tubes 3, 5 and 7.

I claim:

1. A tubing assembly for a bicycle frame, comprising:
    a tubular metal connector formed with a cylindrical wall and a plurality of spaced apart hemispherical bulges protruding radially exteriorly from said cylindrical wall;
    respective tubes adapted to define said frame and each having an end closely fitted over and wholly receiving a respective one of said bulges whereby an end face of each tube substantially meets said cylindrical wall at a base of the respective bulge, whereby each of said hemispherical bulges is wholly received in a respective one of said tubes; and
    respective circular weld seams welding each end face to said wall at the base of the respective hemispherical bulge.

2. The tubing assembly defined in claim 1 wherein said connector is a pedal-link bearing housing formed from two interlocked sheet metal elements and provided with at least three of said bulges each having a respective end of a respective tube fitted thereover and welded to said connector by a respective circular weld seam, two of said bulges being formed on one of said elements, the other of said bulges being formed on the other of said elements.

* * * * *